United States Patent
Girnyk et al.

(10) Patent No.: US 10,700,762 B2
(45) Date of Patent: Jun. 30, 2020

(54) BEAM FORMING USING AN ANTENNA ARRANGEMENT

(71) Applicant: Telefonaktiebolaget LM Ericsson (publ), Stockholm (SE)

(72) Inventors: Maksym Girnyk, Stockholm (SE); Sven Petersson, Sävedalen (SE)

(73) Assignee: Telefonaktiebolaget LM Ericsson (Publ) (SE)

( * ) Notice: Subject to any disclaimer, the term of this patent is extended or adjusted under 35 U.S.C. 154(b) by 77 days.

(21) Appl. No.: 15/100,482

(22) PCT Filed: May 4, 2016

(86) PCT No.: PCT/EP2016/060001
§ 371 (c)(1),
(2) Date: May 31, 2016

(87) PCT Pub. No.: WO2017/190777
PCT Pub. Date: Nov. 9, 2017

(65) Prior Publication Data
US 2018/0097558 A1    Apr. 5, 2018

(51) Int. Cl.
*H01Q 3/01*    (2006.01)
*G01S 13/89*   (2006.01)
(Continued)

(52) U.S. Cl.
CPC ............ *H04B 7/10* (2013.01); *H01Q 1/246* (2013.01); *H01Q 3/26* (2013.01); *H01Q 3/40* (2013.01);
(Continued)

(58) Field of Classification Search
CPC ............ H01Q 1/246; H01Q 3/40; H01Q 3/26; H01Q 21/0037; H01Q 25/002; H04B 7/10;
(Continued)

(56) References Cited

U.S. PATENT DOCUMENTS

| 6,218,987 B1 | 4/2001 | Derneryd et al. |
| 7,027,839 B2 | 4/2006 | Umesh et al. |

(Continued)

FOREIGN PATENT DOCUMENTS

| CN | 1261989 A    | 8/2000 |
| CN | 102404035 A  | 4/2012 |

(Continued)

OTHER PUBLICATIONS

Gunter Dueck, "New Optimization Heuristics: The Great Deluge Algorithm and the Record-to-Record Travel," Journal of Computational Physics, vol. 104(1):86-92, Jan. 1993 doi:10.1006/jcph.1993.1010, consisting of 7-pages.

(Continued)

*Primary Examiner* — Dao L Phan
(74) *Attorney, Agent, or Firm* — Christopher & Weisberg, P.A.

(57) ABSTRACT

There are provided mechanisms for beam forming using an antenna array comprising dual polarized elements. A method comprises generating one or two beam ports. The one or two beam ports are defined by combining at least two non-overlapping subarrays. Each subarray has two subarray ports. The two subarray ports have identical power patterns and mutually orthogonal polarizations. The at least two non-overlapping subarrays are combined via expansion weights. The expansion weights and map the one or two beam ports to subarray ports such that the one or two beam ports have the same power pattern as the subarrays. At least some of the expansion weights have identical non-zero magnitude and are related in phase to form a transmission lobe. The method comprises transmitting signals using said one or two beam ports.

22 Claims, 5 Drawing Sheets

(51) Int. Cl.
  *H04B 7/10* (2017.01)
  *H01Q 1/24* (2006.01)
  *H01Q 3/26* (2006.01)
  *H01Q 3/40* (2006.01)
  *H04W 52/42* (2009.01)
  *H01Q 25/00* (2006.01)
  *H04B 7/0456* (2017.01)
  *H04B 7/06* (2006.01)
  *H01Q 21/00* (2006.01)

(52) U.S. Cl.
  CPC ....... *H01Q 21/0037* (2013.01); *H01Q 25/002* (2013.01); *H04B 7/0469* (2013.01); *H04B 7/0617* (2013.01); *H04B 7/0691* (2013.01); *H04W 52/42* (2013.01)

(58) Field of Classification Search
  CPC .. H04B 7/0617; H04B 7/0469; H04B 10/532; H04W 52/42
  USPC .................. 342/81, 368, 372, 373; 375/308
  See application file for complete search history.

(56) References Cited

U.S. PATENT DOCUMENTS

| | | | |
|---|---|---|---|
| 7,062,002 | B1 | 6/2006 | Michel et al. |
| 8,774,079 | B2 | 7/2014 | Proctor, Jr. et al. |
| 8,994,588 | B2 | 3/2015 | Petersson et al. |
| 9,059,760 | B2 | 6/2015 | Jiang et al. |
| 9,509,387 | B2 | 11/2016 | Athley et al. |
| 9,960,828 | B2 | 5/2018 | Petersson et al. |
| 10,014,923 | B2 | 7/2018 | Molnar et al. |
| 2005/0157805 | A1 | 7/2005 | Walton et al. |
| 2006/0008021 | A1 | 1/2006 | Bonnet |
| 2007/0135161 | A1 | 6/2007 | Molnar et al. |
| 2008/0187066 | A1 | 8/2008 | Wang et al. |
| 2009/0033556 | A1 | 2/2009 | Strickley et al. |
| 2009/0066595 | A1 | 3/2009 | Barker et al. |
| 2009/0080560 | A1 | 3/2009 | Na et al. |
| 2009/0190681 | A1 | 7/2009 | Moulsley et al. |
| 2010/0104036 | A1 | 4/2010 | Liao et al. |
| 2010/0158331 | A1 | 6/2010 | Jacobs et al. |
| 2010/0189047 | A1 | 7/2010 | Baum et al. |
| 2010/0310009 | A1 | 12/2010 | Lakkis |
| 2010/0316154 | A1 | 12/2010 | Park et al. |
| 2011/0019759 | A1 | 1/2011 | Stager et al. |
| 2011/0199992 | A1 | 8/2011 | Barker et al. |
| 2011/0212730 | A1 | 9/2011 | Wennstrom et al. |
| 2011/0216845 | A1 | 9/2011 | Nakao et al. |
| 2012/0027111 | A1 | 2/2012 | Vook et al. |
| 2012/0212372 | A1 | 8/2012 | Petersson et al. |
| 2012/0274514 | A1 | 11/2012 | Petersson et al. |
| 2012/0287981 | A1 | 11/2012 | Xiao et al. |
| 2012/0319920 | A1 | 12/2012 | Athley et al. |
| 2013/0120191 | A1 | 5/2013 | Zhang et al. |
| 2013/0121276 | A1 | 5/2013 | Kim et al. |
| 2014/0071792 | A1 | 3/2014 | Yoo et al. |
| 2014/0285373 | A1 | 9/2014 | Kuwahara et al. |
| 2014/0362946 | A1 | 12/2014 | Kakishima et al. |
| 2015/0010106 | A1 | 1/2015 | Skov et al. |
| 2015/0326289 | A1 | 11/2015 | Kim et al. |
| 2015/0333884 | A1 | 11/2015 | Athley |
| 2016/0021551 | A1 | 1/2016 | Park et al. |
| 2016/0065290 | A1 | 3/2016 | Zhu et al. |
| 2016/0149680 | A1 | 5/2016 | Kang et al. |
| 2016/0377713 | A1 | 12/2016 | Kamo et al. |
| 2017/0041113 | A1 | 2/2017 | Park et al. |
| 2017/0310376 | A1 | 10/2017 | Jarmyr et al. |

FOREIGN PATENT DOCUMENTS

| | | | |
|---|---|---|---|
| CN | 102640352 | A | 8/2012 |
| CN | 103650366 | A | 3/2014 |
| EP | 1764867 | A1 | 3/2007 |
| EP | 2 680 471 | A1 | 1/2014 |
| RU | 2374724 | C1 | 11/2009 |
| RU | 2009119753 | A | 12/2010 |
| RU | 2414064 | C2 | 3/2011 |
| WO | 1999033212 | A1 | 7/1999 |
| WO | 2000054424 | A2 | 9/2000 |
| WO | 2000062436 | A1 | 10/2000 |
| WO | 2007082408 | A1 | 7/2007 |
| WO | 2011050866 | A1 | 5/2011 |
| WO | 2014206443 | A1 | 12/2014 |
| WO | 2015081999 | A1 | 6/2015 |
| WO | 2016102010 | A1 | 6/2016 |
| WO | 2016141961 | A1 | 9/2016 |
| WO | 2017190777 | A1 | 11/2017 |
| WO | 2017190811 | A1 | 11/2017 |

OTHER PUBLICATIONS

International Search Report and Written Opinion dated Jan. 16, 2017 for International Application SN: PCT/EP2016/075517, International Filing Date—Oct. 24, 2016 consisting of 15-pages.
International Search Report and Written Opinion dated Jan. 26, 2017 for International Application SN: PCT/EP2016/060001, International Filing Date—May 4, 2016 consisting of 15-pages.
International Search Report dated Nov. 17, 2015 issued in PCT Application No. PCT/EP2015/054783, consisting of 5 pages.
International Search Report dated May 19, 2016 issued in PCT Application No. PCT/EP2016/054622, consisting of 5 pages.
Non-Final Office Action from related U.S. Appl. No. 15/548,464 dated Jul. 9, 2018, consisting of 17 pages.
State Intellectual Property Office of the People's Republic of China First Office Action, dated Mar. 2, 2018 issued in Application No. 201580077091.1, consisting of 7 pages.
Decision to grant of the Russian patent office, dated Apr. 23, 2018, Issued in Application No. 017134777/07(061040), consisting of 17 pages.
Decision to grant of the Russian patent office, dated Apr. 19, 2018, Issued in Application No. 2017134768/07(061030), consisting of 20 pages.
Federal Institute for Industrial Property (FIPS) Search Report, dated Feb. 27, 2018, Issued in Application No. 2017134768/07(061030), consisting of 4 pages.
Federal Institute for Industrial Property (FIPS) Search Report, dated Apr. 13, 2018, Issued in Application No. 2017134777/07(061040), consisting of 4 pages.
Communication Pursuant to Article 94(3) EPC, dated Sep. 28, 2018, Issued in Application No. 16707804.7, consisting of 5 pages.
Rappaport(Invention Disclosure), titled "State of the Art in 60-GHz Integrated Circuits and Systems for Wireless Communications"Proceedings of the IEEE | vol. 99, No. 8, Aug. 2011 Aug. 8, 2011, consisting of 47 pages.
Office Action dated Jan. 30, 2019 for U.S. Appl. No. 15/548,464 filed Aug. 3, 2017, consisting of 23-pages.
Korean Summary of the Notice of Preliminary Rejection and English Translation dated Jul. 4, 2019 for Korean Patent Application No. 2017-7025692, consisting of 12-pages.
3GPP TSG-RAN WG1 #68bis R1-121761; Title: Precoding Codebook Design for Four branch MIMO System; Agenda Item: 6.3.4; Source: Ericsson: Document for: Decision; Location and Date: Jeju, South Korea, Mar. 26-30, 2012, consisting of 14-pages.
Notice of Allowance and Fee(s) Due dated Sep. 9, 2019, Issued in U.S. Appl. No. 15/548,464 filed on Aug. 3, 2017, consisting of 13-pages.
Chinese Office Action and English Translation dated Jan. 3, 2020 for Application No. 201680085332.1, consisting of 17-pages/
Kokshoorn et al. "Fast Channel Estimation for Millimetre Wave Wireless Systems Using Overlapped Beam Patterns" IEEE ICC 2015 SAC—Millimeter-wave Communications, pp. 1304-1309, consisting of 6-pages.
Indian Examination Report dated Dec. 18, 2019 for Application No. 201747034875, consisting of 8-pages.

BEAM FORMING USING AN ANTENNA ARRANGEMENT

TECHNICAL FIELD

Embodiments presented herein relate to beam forming, and particularly a method, an antenna array, and a computer program for beam forming using an antenna array comprising dual polarized elements.

BACKGROUND

In wireless communications networks, antenna design may be key to obtaining good performance and capacity. This applies for the wireless communication from a network node to a wireless user terminal or conversely, as well as between two network nodes. For example, massive beam forming, i.e., beam forming using active antenna arrays where antenna elements are orders of magnitude more numerous than in current communications networks, is expected to become a technical component in the radio access part of future fifth generation (5G) communications networks. By the deployment of large antenna arrays at the radio base stations, user data can be transmitted focused in space so that energy is received mainly by the wireless device dedicated by the user data, thus resulting in little interference being perceived by other wireless devices or other types of nodes. Massive beam forming therefore has the potential to increase system capacity and energy efficiency considerably.

According to the Long Term Evolution (LTE) standard, codebooks may be constructed using Discrete Fourier Transform (DFT) based vectors, enabling beamforming towards a fixed set of angular directions. A DFT beam, by its nature, is characterized with a fixed power pattern, whose half-power beamwidth (HPBW) is determined by the parameters of the antenna array (number of antennas, antenna element spacing, HPBW of the power pattern of an antenna element). For example, an antenna array having eight equidistant omnidirectional antennas with a nearest-neighbor spacing of 0.8 wavelengths, excited with a DFT vector will yield a power pattern with a HPBW of 8 degrees.

Generally, the power pattern of a DFT-beam pointing at the angle $\phi_0$ transmitted from a ULA having N antennas can be described by the Dirichlet kernel $|G(\theta)|$ as follows:

$$|G(\theta)| = \left| \frac{\sin[N\pi d_\lambda (\sin\phi - \sin\phi_0)]}{\sin[\pi d_\lambda (\sin\phi - \sin\phi_0)]} \right|.$$

Figure 1:
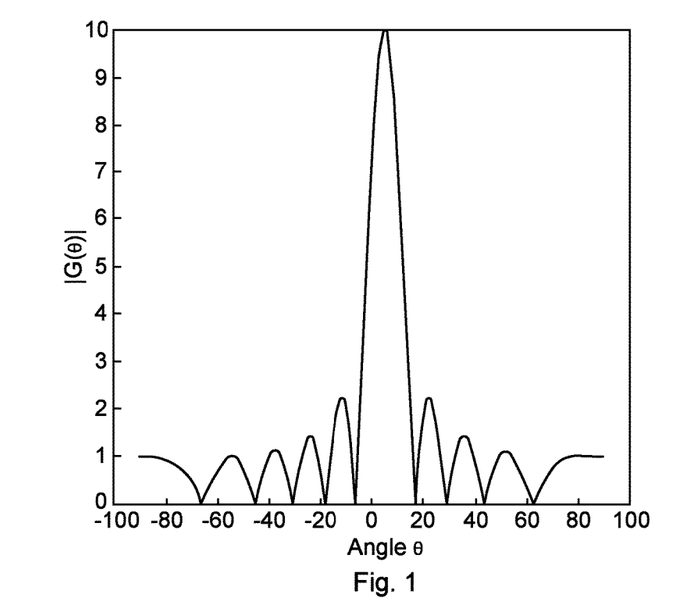
FIG. 1 illustrates the power pattern of a transmission beam.

As follows from the above expression for $|G(\theta)|$, as the number or antennas N in the ULA increases, the power pattern becomes more and more narrow and increases the antenna gain at $\phi=\phi_0$. Actually, as $N \to \infty$ the Dirichlet kernel approaches a Dirac delta function with infinitely small beam width and infinite antenna gain a $\phi=\phi_0$. FIG. 1 illustrates the power pattern in terms of $|G(\theta)|$ as a function of angle $\theta$ for a DFT beam with N=10, $\phi_0=5°$.

At the same time, apart from creating (narrow) device-specific beams, the radio base station must be capable of also creating wide cell-specific beams to cover the entire sector/cell with a desired level of radiation. This might be needed, e.g., for sending broadcast information or common reference signals. Existing approaches to address this issue will be summarized next.

According to a first approach, a separate wide-beam antenna may be used for transmission of broadcast data. A drawback with this approach is that it requires additional hardware.

According to a second approach, broadcast data is transmitted using a single antenna array element, or sub-array, of the antenna. This array element or sub-array will have a wider beam than the full array of the antenna. A drawback of this approach is that only one, or a few, power amplifiers (PAs) in the antenna array is/are utilized, which thus wastes power resources.

According to a third approach, amplitude and/or phase tapering is used over the full array of the antenna to widen the beam. Drawbacks with such tapering are that amplitude tapering gives poor utilization of the PA resource and that it is in many cases not possible to synthesize the desired beam shape using phase-only tapering.

According to a fourth approach, broadcast data is transmitted sequentially in different directions using narrow beams. A potential drawback with this approach is that this takes longer time and consumes more resource elements than transmitting broadcast data simultaneously in all directions with a wide beam.

Other scenarios where it may be desirable to use wide beams with an antenna array with many elements is in millimeter-wave communications, which is an access technology foreseen to be a part of 5G radio access. Due to the increased propagation loss at such high frequencies, high gain beam forming may be needed to retain the link budget, possibly both at the receiver and transmitter. Beam forming may be needed since the dominant propagation paths between a transmitter and a receiver are typically not known a priori. Testing all combinations of a large number of narrow transmit and receive beams in order to find the best beam pair may consume a prohibitive amount of time/frequency resources. A way to resolve this issue may be for the radio base station to start the search procedure with wide beams and then make the beams narrower and narrower until the best pair of narrow beams has been found. Such a beam finding procedure generally requires means for generating beams with different beam widths in a flexible manner. In order to fully utilize the antenna array and the available PA resource it may be desired to use all antenna elements and all PAs at full power when transmitting beams with different beam widths.

Hence, there is a need for improved beam forming.

SUMMARY

An object of embodiments herein is to provide efficient beam forming.

According to a first aspect there is presented a method for beam forming using an antenna array comprising dual polarized elements. The method comprises generating one or two beam ports. The one or two beam ports are defined by combining at least two non-overlapping subarrays. Each subarray has two subarray ports. The two subarray ports have identical power patterns and mutually orthogonal polarizations A, B. The at least two non-overlapping subarrays are combined via expansion weights $w_A$ and $w_B$, each of length M, where M≥2 is an arbitrary integer, and expansion weights $w_A$ are applied to polarization A and expansion weights $w_B$ are applied to polarization B. The expansion weights $w_A$ and $w_B$ map the one or two beam ports to subarray ports such that the one or two beam ports have the same power pattern as the subarrays. At least some of the expansion weights $w_A$ and $w_B$ have identical non-zero magnitude and are related in phase to form a transmission lobe. The method comprises transmitting signals using said one or two beam ports.

According to a second aspect there is presented an antenna arrangement comprising an antenna array. The antenna array comprises dual polarized elements for beam forming. The antenna array further comprises a processor. The processor is configured to cause the antenna arrangement to generate one or two beam ports. The one or two beam ports are defined by combining at least two non-overlapping subarrays. Each subarray has two subarray ports. The two subarray ports have identical power patterns and mutually orthogonal polarizations A, B. The at least two non-overlapping subarrays are combined via expansion weights $w_A$ and $w_B$, each of length M, where M≥2 is an arbitrary integer, and expansion weights $w_A$ are applied to polarization A and expansion weights $w_B$ are applied to polarization B. The expansion weights $w_A$ and $w_B$ map the one or two beam ports to subarray ports such that the one or two beam ports have the same power pattern as the subarrays. At least some of the expansion weights $w_A$ and $w_B$ have identical non-zero magnitude and are related in phase to form a transmission lobe. The processor is configured to cause the antenna arrangement to transmit signals using the one or two beam ports.

According to a third aspect there is presented antenna arrangement comprising an antenna array. The antenna array comprises dual polarized elements for beam forming. The antenna array further comprises a generate module configured to generate one or two beam ports. The one or two beam ports are defined by combining at least two non-overlapping subarrays. Each subarray has two subarray ports. The two subarray ports have identical power patterns and mutually orthogonal polarizations A, B. The at least two non-overlapping subarrays are combined via expansion weights $w_A$ and $w_B$, each of length M, where M≥2 is an arbitrary integer, and expansion weights $w_A$ are applied to polarization A and expansion weights $w_B$ are applied to polarization B. The expansion weights $w_A$ and $w_B$ map the one or two beam ports to subarray ports such that the one or two beam ports have the same power pattern as the subarrays. At least some of the expansion weights $w_A$ and $w_B$ have identical non-zero magnitude and are related in phase to form a transmission lobe. The antenna array further comprises a transmit module configured to transmit signals using said one or two beam ports.

According to a fourth aspect there is presented an antenna arrangement comprising an antenna array. The antenna array comprises dual polarized elements for beam forming. The antenna array is characterized in comprising expansion weights $w_A$ and $w_B$ determined such that, for any integer $\tau_1$, $R_{w_A}(\tau_1)+R_{w_B}(\tau_1)=2M\delta(\tau_1)$, or for any non-zero integer $\tau_2$, $|R_{w_A}(\tau_2)+R_{w_B}(\tau_2)|\varepsilon$, where $R_{w_A}(\tau)$ and $R_{w_B}(\tau)$ are aperiodic autocorrelation functions of the expansion weights $w_A$ and $w_B$, where $\delta(\tau)$ is the Kronecker delta function, and where $\varepsilon$ is constant with respect to $\tau$.

There is also presented a network node comprising an antenna arrangement according to the second, third, or fourth aspect.

There is also presented a wireless device comprising an antenna arrangement according to the second, third, or fourth aspect.

According to a fifth aspect there is presented a computer program for beam forming using an antenna array comprising dual polarized elements, the computer program comprising computer program code which, when run on a processor of an antenna arrangement, causes the antenna array to perform a method according to the first aspect.

According to a sixth aspect there is presented a computer program product comprising a computer program according to the fifth aspect and a computer readable means on which the computer program is stored.

Advantageously this method, these antenna arrangements, and this computer program provide efficient beam forming.

Advantageously this method, these antenna arrangements, and this computer program provide a means to create wide beams in a power-efficient way.

The one or two beam ports have identical power patterns and orthogonal polarizations in any direction.

The beam width for the one or two beam ports can be very wide compared to the array size, even as wide as for a single element.

All power amplifiers of the antenna array can be fully utilized, i.e. with only phase taper applied, either by each beam port or by two beam ports together.

Advantageously this method, these antenna arrangements, and this computer program provide can be used for expansion of subarrays of antennas, preserving the power patterns of the latter.

The antenna architecture can be based on either linear (1-D) or planar (2-D) antenna arrays.

It is to be noted that any feature of the first, second, third, fourth, fifth and sixth aspects can be applied to any other aspect, wherever appropriate. Likewise, any advantage of the first aspect can equally apply to the second, third, fourth aspect, fifth, and/or sixth respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

The herein proposed antenna array and method offers both beam patterns with desired beam shapes, as well as excellent power utilization. The embodiments disclosed herein particularly relate to efficient beam forming. In order to obtain efficient beam forming here is provided an antenna array, a method performed by the antenna array, a computer program comprising code, for example in the form of a computer program product, that when run on a processor, causes the antenna array to perform the method.

Figure 2:
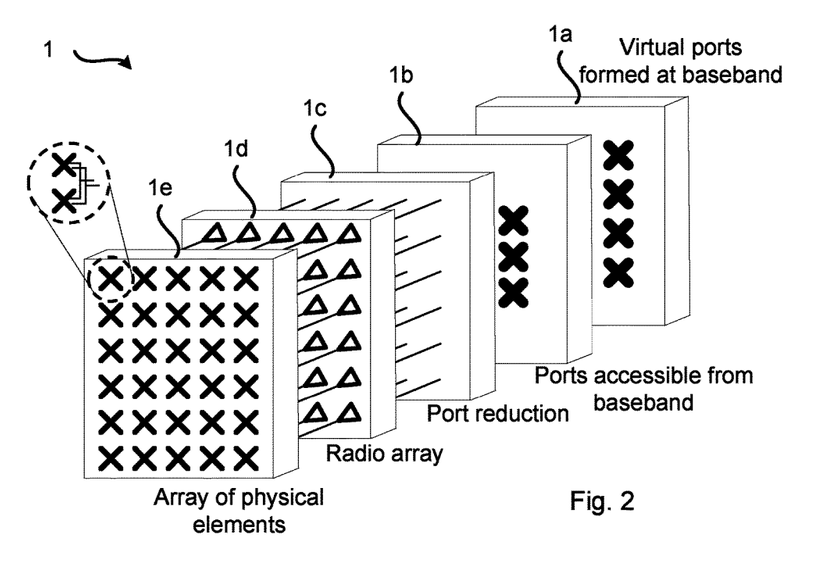
FIGS. 2, 3, 4, and 5 are schematic diagrams illustrating different aspects of antenna arrays according to embodiments.

FIG. 2 is a schematic block diagram illustrating an example architecture of a two dimensional antenna array 1 for which embodiments presented herein can be applied. However, the embodiments presented herein are equally applicable to one-dimensional antenna arrays. The antenna array 1 can thus either be a linear array (1-D), a uniform linear array (ULA), or planar array (2-D), uniform rectangular array (URA).

The antenna front end comprises an array 1e of antenna elements where each antenna element can be a sub-array of several radiating antenna elements connected via feed networks to two subarray ports having orthogonal polarization. Hence, the antenna array 1 comprises dual polarized elements. In this respect the term dual polarized elements shall be interpreted to encompass two sets of single polarized elements having mutually orthogonal polarization.

Each subarray port is connected to a radio chain as comprised in a radio array 1d. The number of subarray ports in block 1b accessible to baseband signal processing can be reduced via a port reduction block 1c that creates new antenna ports that are (linear) combinations of the input antenna ports. Access for a signal to be transmitted is made to the subarray ports at a baseband frequency representation of the signal if both dedicated and broadcasted data are to be transmitted at the same time. Further, in general terms, access to all subarray ports can be needed for shaping wide beams according to the herein disclosed mechanisms for beam forming. In the baseband signal processing block 1a virtual antenna ports can be created by matrix multiplications. These virtual antenna ports can be of different type. For example, in LTE they can for a radio base station carry common reference signals (CRS) at ports 0-3, channel state information reference signals (CSI-RS) at port 15-22, and UE-specific reference signals and data at ports 7-14. In some implementations one or several blocks of the in the two dimensional antenna array 1 in FIG. 2 can be removed.

Figure 3:
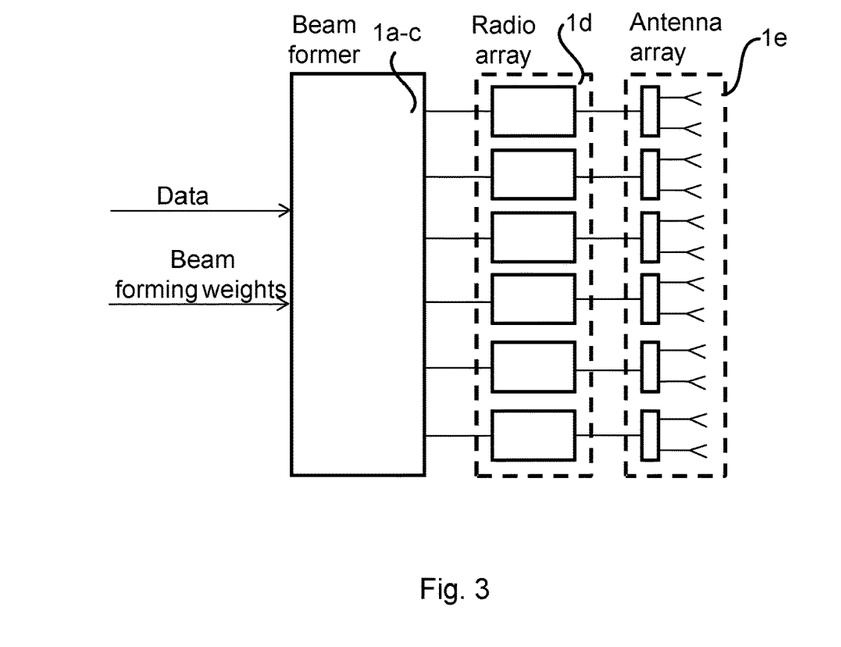
Figure 4:
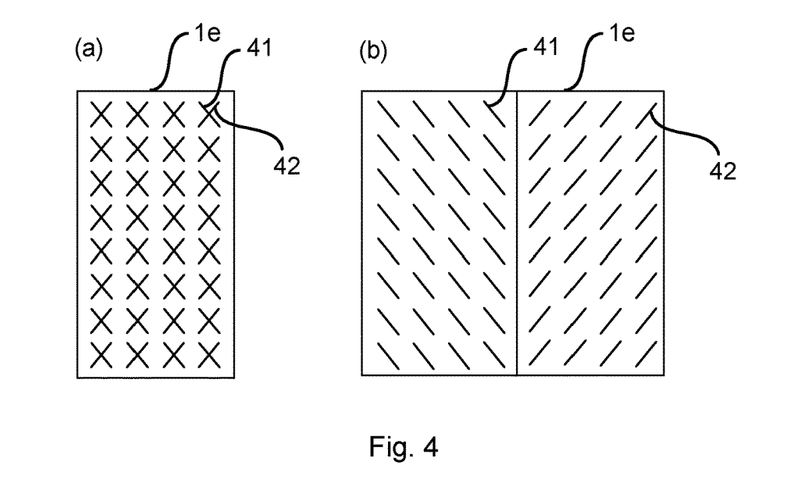

FIG. 3 is a schematic block diagram illustrating a possible implementation of the two dimensional antenna array 1 of FIG. 2. It comprises a beam former comprising blocks 1a, 1b, 1c of FIG. 2, a radio array 1d and a physical antenna array 1e. In the example of FIG. 3 there are two antenna ports per subarray. The beam former 1a-c is configured to receive user data and control data, beam forming weights for the user data, beam forming weights for reference signals, such as CSI-RS and beam forming weights for wide beam transmission. Each antenna element comprises two sub-elements 41, 42 having orthogonal polarizations in all directions (of interest). Typically these two sub-elements 42, 42 are located at the same position, as in FIG. 4(a), but they can as well be displaced in relation to each other, as in FIG. 4(b).

As will be described below, the antenna array 1 can be part of an antenna arrangement 100. The antenna arrangement 100 is configured to generate one or two beam ports, wherein the beam ports are defined by combining at least two non-overlapping subarrays. As the skilled person understands, the antenna array 1 can be configured to generate further ports defined for various transmissions. The one or two beam ports are defined by combining at least two non-overlapping subarrays. Each subarray has two subarray ports. The two subarray ports have identical or nominally identical or near-identical power patterns and mutually orthogonal polarizations A, B (or polarization states).

A subarray can be defined as a group of one or more dual polarized antenna elements. These antenna elements are fed from two subarray ports of a feed network arranged such that the two subarray ports have the same total power patterns and have orthogonal polarizations. The subarrays may be configured by redefining the number of antenna elements, and/or the feed network, etc., such that desired port properties (such as beam width, beam shapes, etc.) are fulfilled. As defined herein, the power pattern shall thus be regarded as the combination of the power patterns for the two orthogonal polarizations, thus representing the total power pattern.

The at least two non-overlapping subarrays are combined via expansion weights $w_A$ and $w_B$, each of length M, where M≥2 is an arbitrary integer, and expansion weights $w_A$ are applied to polarization A and expansion weights $w_B$ are applied to polarization B. The expansion weights $w_A$ and $w_B$ map the one or two beam ports to subarray ports such that the one or two beam ports have the same power pattern as the subarrays. At least some of the expansion weights $w_A$ and $w_B$ have identical non-zero magnitude and are related in phase to form a transmission lobe. The antenna arrangement 100 is configured to transmit signals using the one or two beam ports. As the skilled person understands, the antenna array 1 can be configured to transmit further signals using the same, or further, beam ports. The signals can comprise at least one of broadcast information and system information.

Embodiments relating to further details of beam forming using an antenna array 1 will now be disclosed.

In general terms, the expansion weights describe how one or two beam ports, formed via a single set of subarrays, can be mapped onto multiple sets of subarrays. According to one embodiment the expansion weights $w_A$ and $w_B$ map the one or two beam ports to subarray ports such that the one or two beam ports have the same power pattern as the subarrays, and in the case there are two beam ports, the two beam ports have mutually orthogonal polarizations A, B in any direction. In this respect there is one set of expansion weights $w_A$ and $w_B$, respectively, per beam port. That is, the notations A and B denote two orthogonal polarizations for a subarray port, combination of subarray ports or a beam port. It does not refer to the specific polarization for the different ports.

There can be different ways to determine the at least two non-overlapping subarrays and to combine the at least two non-overlapping subarrays via the expansion weights $w_A$ and $w_B$. Different embodiments relating thereto will now be described in turn.

In general terms, generating the one or two beam ports yielding both the desired beam width and using the entire antenna array for good utilization of power resources can involve determining subarray port mappings for the one or two beam ports, and expanding subarray mappings to the entire antenna array.

For maximal use of the antenna array the subarray size can be determined such that the subarray size, including the possible expansions, covers the entire array. Hence, according to an embodiment the at least two non-overlapping subarrays together cover all elements of the antenna array.

Figure 5:
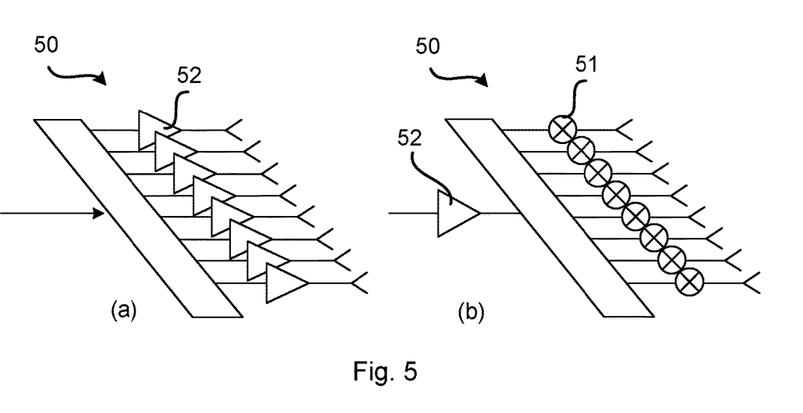

All antenna elements in the port mapping can have the same amplitude; the expansion itself gives full power utilization but the subarray might not reach that. For example, all of the expansion weights $w_A$ and $w_B$ can have unit modulus. One reason for using all antenna elements in the antenna array, as well as for the subarray port mapping, and thus beam port mapping, to have uniform amplitude, is to efficiently use the available power resource. This applies specifically for an active antenna array with distributed power amplifiers but it also applies for an antenna array with a power distribution network 50 comprising phase shifters 51, possibly also attenuators 52 as in FIGS. 5(a) and 5(b). This is especially suitable for beamforming performed via phase shifters only.

In some cases it can be beneficial if both beam ports share the same power amplifiers whereas in other cases, for example if correlated signals are to be applied to the two antenna ports, this is not desirable. One reason is that correlated signals in combination with shared power amplifiers can lead to non-uniform loading of the power amplifiers. In case the antenna ports are to share power amplifiers, or in case only a single antenna port is to be used, this is achievable, for example, by adding the two expansion weights, each one defining a beam port, to each other, element by element. According to one embodiment the expansion weights $w_A$ and $w_B$ of the at least two sub-arrays can thus be added to generate one of the one or two beam ports. Further, the expansion weights $w_A$ and $w_B$ can be determined such that the sum of the power spectra generated by the expansion weights $w_A$ and $w_B$ per polarization is spatially white.

Further embodiments relating to how the expansion weights can be determined will now be disclosed.

There can be different values of M. For example according to an embodiment, M is a product of powers of 2, 3, 5, 11, or 13. Particularly, according to an example, $M=2^{a+f}3^b5^c11^d13^e$. Here, a, b, c, d, e, f are non-negative integers. The non-negative integers a, b, c, d, e, f may be determined such that $f \leq c+e$ and $b+c+d+e \leq a+2f+1$. As an example, for M=2 the expansion weights $w_A$ and $w_B$ can be proportional to vectors $z_A$ and $z_B$ given as:

$z_A = e^{j\theta_A}(j,-j)^T$, and $z_B = e^{j\theta_B}(1,1)^T$, where $\theta_A$ and $\theta_B$ are arbitrary real numbers. The real numbers $\theta_A$ and $\theta_B$ could represent arbitrary phase shifts. As an example, for M=3 the expansion weights $w_A$ and $w_B$ can be proportional to vectors $z_A$ and $z_B$ given as:

$z_A = e^{j\theta_A}(1,j,1)^T$, and $z_B = e^{j\theta_B}(1,1,-1)^T$.

As an example, for M=5 the expansion weights $w_A$ and $w_B$ can be proportional to vectors $z_A$ and $z_B$ given as:

$z_A = e^{j\theta_A}(1,1,1,-j,j)^T$, and $z_B = e^{j\theta_B}(1,j,-1,1,-j)^T$.

Further, according to an embodiment the expansion weights $w_A$ and $w_B$ are determined such that, for any integer $\tau$:

$R_{w_A}(\tau) + R_{w_B}(\tau) = 2M\delta(\tau)$, where $R_{w_A}(\tau)$ and $R_{w_B}(\tau)$ are aperiodic autocorrelation functions of the expansion weights $w_A$ and $w_B$, where $\delta(\tau)$ is the Kronecker delta function.

The aperiodic autocorrelation function for a sequence $u = \langle u_1, u_2, \ldots, u_N \rangle$ can be defined as:

$$R_u(\tau) = \begin{cases} \sum_{m=1}^{N-\tau} u_m u_{m+\tau}^*, & 0 \leq \tau \leq N-1, \\ \sum_{m=1}^{N+\tau} u_{m-\tau} u_m^*, & -N+1 \leq \tau \leq 0, \\ 0, & \tau \leq -N \text{ or } \tau \geq N. \end{cases}$$

Figure 6:
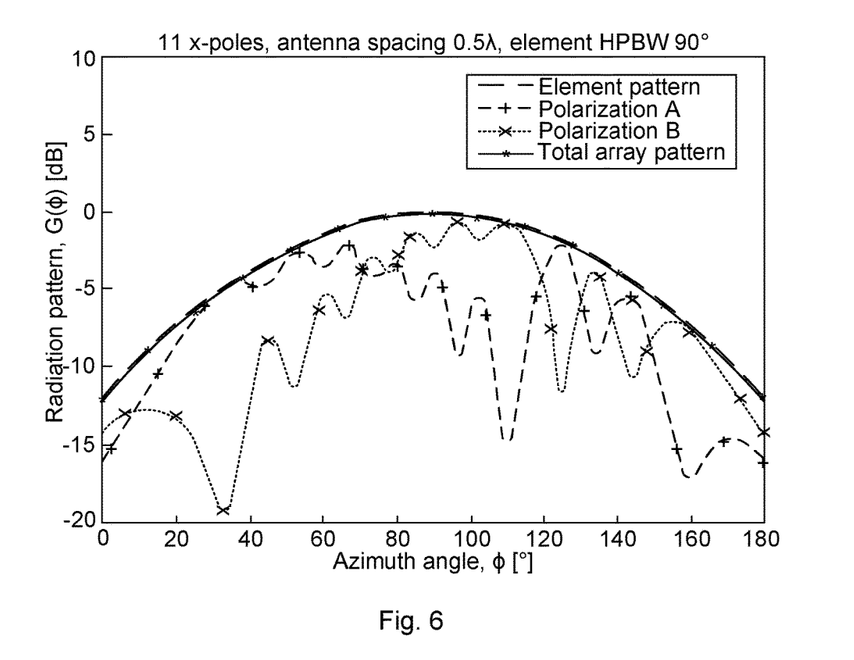
FIGS. 6, 7, and 8 shows simulation results.

The expression $R_{w_A}(\tau) R_{w_B}(\tau) = 2M\delta(\tau)$ is true, for example, for expansion weights $w_A$ and $w_B$ defined by quaternary Golay complementary sequences. Hence according to an embodiment the expansion weights $w_A$ and $w_B$ are proportional to quaternary Golay complementary sequences. As a first example, expansion weights $w_A$ and $w_B$ of length M=11 can be proportional to vectors $z_A$ and $z_B$ given as:

$z_A = e^{j\theta_A}(1,j,-1,1,-1,j,-j,-1,j,j,1)^T$, and $z_B = e^{j\theta_B}(1,1,-j,j,-j,1,1,j,-1,1,-1)^T$.

where, again, $\theta_A$ and $\theta_B$ are arbitrary real numbers (which could represent arbitrary phase shifts). The phases of the per-polarization complex expansion weights $w_A$ and $w_B$ can thus be arbitrarily rotated without disturbing the desired wide-beam property. FIG. 6 shows the power pattern of an antenna array 1 consisting of M=11 dual-polarized antennas and with expansion weights $w_A$ and $w_B$ given as $z_A$ and $z_B$ above for M=11. FIG. 6 plots the per-polarization power patterns, as well as the total beam power pattern. As it is seen from FIG. 6, the total power pattern of the array is the same as the pattern of an array sub-element.

Figure 7:
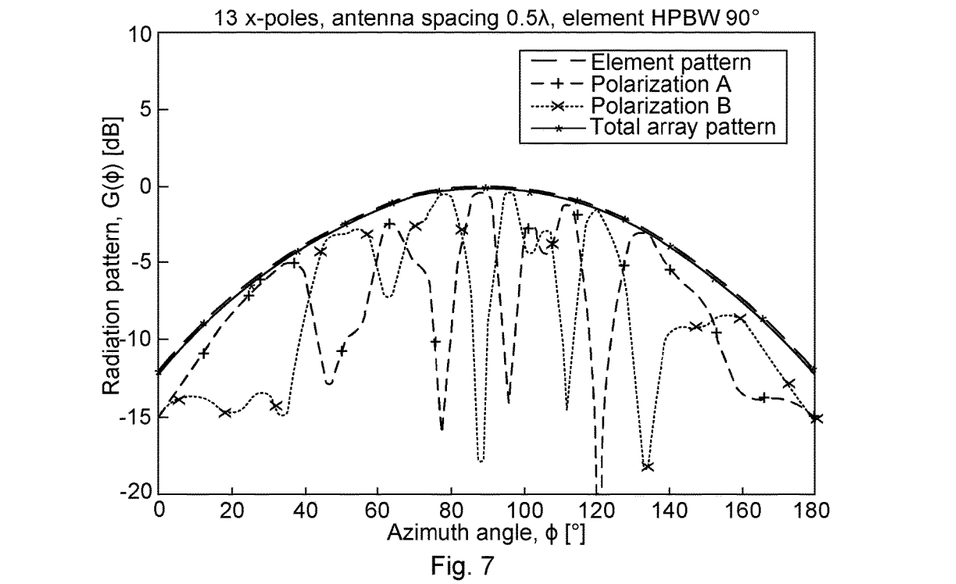

As a second example, expansion weights $w_A$ and $w_B$ of length M=13 can be proportional to vectors $z_A$ and $z_B$ given as:

$z_A = e^{j\theta_A}(1,1,1,j,-1,1,1,-j,1,-1,1,-j,j)^T$, and $z_B = e^{j\theta_B}(1,j,-1,-1,-1,j,-1,1,1,-j,-1,1,-j)^T$, where, again, $\theta_A$ and $\theta_B$ are arbitrary real numbers (which could represent arbitrary phase shifts). FIG. 7 shows the power pattern of an antenna array 1 consisting of M=13 dual-polarized antennas and with expansion weights $w_A$ and $w_B$ given as $z_A$ and $z_B$ above for M=13. FIG. 7 plots the per-polarization patterns, as well as the total beam pattern. As it is seen from FIG. 7, the total power pattern of the array is the same as the pattern of an array sub-element.

In general terms, $z_A$ and $z_B$ as given above for M=11 and M=13 are just examples and there exist other examples of $z_A$ and $z_B$ for M=11 and M=13 for which the expression $R_{z_A}(\tau)+R_{z_B}(\tau)=2M\delta(\tau)$ holds. For example, this expression holds for all $z_A$ and $z_B$ where any of the operations tabulated below are performed:

| | | | |
|---|---|---|---|
| Reversal | $z_A \to \overleftarrow{z_A}$ | and | $z_B \to \overleftarrow{z_B}$ |
| Interchange | $z_A \to z_B$ | and | $z_B \to z_A$ |
| Conjugate-reversal | $z_A \to \overleftarrow{z_A}^*$ | and/or | $z_B \to \overleftarrow{z_B}^*$ |
| Constant phase offset | $z_A \to e^{j\delta}z_A$ | and/or | $z_B \to e^{j\delta}z_B$ |
| Incremental phase offset | $z_{A,m} \to e^{jm\delta}z_{A,m}$ | and | $z_{B,m} \to e^{jm\delta}z_{B,m}$ |
| Zero-padding | $z_A \to (0^T, z_A^T, 0^T)^T$ | and | $z_B \to (0^T, z_B^T, 0^T)^T$ |

The above expansion weights $w_A$ and $w_B$ applied to antenna elements at polarizations A and B, respectively, lead to a spatially flat array factor, which means that the corresponding beam achieves the beamwidth of a single array subelement.

The above expansion weights $w_A$ and $w_B$ may only exist for some values of M, such as M=2, 3, 4, 5, 6, 8, 10, 11, 12, 13, 16, 18, and 20 in consecutive order. Further embodiments disclosed herein enables construction of expansion weights $w_A$ and $w_B$ for an arbitrary number of antennas (and/or arbitrary number of M). Below it will be demonstrated how to construct expansion weights $w_A$ and $w_B$ of lengths being products of powers of 2, 3, 5, 11 and 13. Particularly, according to an embodiment the expansion weights $w_A$ and $w_B$ are determined such that, for any non-zero integer $\tau$:

$$|R_{w_A}(\tau)R_{w_B}(\tau)| \leq \varepsilon, \quad (1)$$

where $R_{w_A}(\tau)$ and $R_{w_B}(\tau)$ are aperiodic autocorrelation functions of the expansion weights $w_A$ and $w_B$, where $\varepsilon \geq 0$ is constant with respect to $\tau$. Sequences fulfilling these properties are hereinafter denoted as polyphase $\varepsilon$-complementary sequence pairs. According to an example the constant $\varepsilon$ represents a side-lobe power tolerance level. There can be different ways to select the value of $\varepsilon$. Generally, $\varepsilon$ is selected as small as necessary for a particular use case; preferably $\varepsilon$ is not selected significantly smaller than this, as added computational effort may be needed to bring the side-lobe power down. Particularly, according to an embodiment the side-lobe power tolerance level $\varepsilon$ is determined such that $\varepsilon \leq 0.025 \cdot 2M$. Setting $\varepsilon=0$ corresponds to producing a perfectly flat power spectrum as a consequence of the properties of the Wiener-Khintchine transform. Hence, $\varepsilon$ determines the level of deviation from a wide beam (level of ripples of the power spectra). In circumstances where $\varepsilon=0$ is not practicable but $\varepsilon$ is set reasonably small, the obtained beam may be regarded as flat for practical purposes. As the skilled person understands, the expression $\varepsilon=0$ shall be interpreted as to mean that the error is of the order of the machine epsilon or the unit of least precision in the system performing the calculations.

There exist different ways to find expansion weights $w_A$ and $w_B$ such that $|R_{w_A}(\tau)+R_{w_B}(\tau)| \leq \varepsilon$ holds for any non-zero integer $\tau$. For example, according to an embodiment the expansion weights $w_A$ and $w_B$ are determined by applying an optimization algorithm to an optimization problem $$\max_{\varphi} U(\varphi),$$

with a utility function given as:

$$U(\varphi) = \left\{ -\left( \sum_{\tau=1}^{M-1} |R_{w_A}(\tau) + R_{w_B}(\tau)|^p \right)^{1/p} \right\}, \quad (2)$$

where $R_{w_A}(\tau)$ and $R_{w_B}(\tau)$, as above, are aperiodic autocorrelation functions of the expansion weights $w_A$ and $w_B$, where $p \geq 1$ is real, and where $\varphi$ is a vector representing individual phases of components of $w_A$ and $w_B$. Hence, $\varphi$ has length M. The vector $\varphi$ should thus not be confused with the above disclosed scalar-valued phase shifts $\theta_A$ and $\theta_B$. From the numerical algorithms known in the literature, a wide range are suitable for the purpose of minimizing the above utility function. For instance, the algorithm may be a simulated annealing algorithm. The optimization algorithm could moreover be a Great Deluge (GD)-type algorithm; see G. Dück, "New optimization heuristics: The great deluge algorithm and the record-to-record travel," *J. Comp. Phys.*, vol. 104, no. 1, pp. 86-92 (1993). An example of an efficient search algorithm, in the form of a modified GD algorithm, for a polyphase $\varepsilon$-complementary sequence pair of a given length (practically feasible, say, up to M=50) is outlined in pseudo-code below:

```
Algorithm 1 GD algorithm for searching
            for polyphase ε-complementary pairs.

Require:    Initial phase vector φ, where φₙ ∈ [0, 2π],
            ∀n ∈ {1, . . . , 2M},
            Initial phase increments vector Δφ where Δφₙ ∈ (0, π),
            ∀n ∈ {1, . . . , 2M},
            Rain intensity V > 0,
            Phase scaling factor α ∈ (0, 1),
            Tolerance threshold ε > 0.
   Compute the water level: λ ← U (φ).
   Initialize the number of unsuccessful alternations: u ← 0.
   while |U (φ)| > ε do
       Initialize the number of dry steps: d ← 0.
       for n = 1 → 2M do
           Increment phase: φₙ ← φₙ + Δφₙ.
           If U(φ) ≥ λ then
               Increase the water level: λ ← λ +|V.
               Increment the number of dry runs: d ← d + 1.
           else
               Reverse step: Δφₙ ← -Δφₙ
               Back off: φₙ ← φₙ + Δφₙ.
           end if
       end for
       if d = 0 then
           Increment the number of unsuccessful
               alternations: u ← u + 1.
           if u ≥ 2 then
               Scale down the step size: Δφ ← αΔφ.
           end if
       else
           Reset the number of dry runs: d ← 0.
       end if
   end while
```

The above outlined algorithm seeks phases $\varphi$ of the excitation weights $w_A$ and $w_B$ by starting with a random configuration, and then perturbing phases to explore the landscape of the utility function $U(\varphi)$. In contrast to gradient-based searches, the above outlined algorithm is not restricted to climbing only uphill. The only restriction is to avoid the ever-increasing water level. In this way the algorithm is capable of escaping the local maxima and ending up in a close proximity to the global optimum. With a proper choice of the initial phase vector the algorithm guarantees that the level of side-lobes is below the pre-determined tolerance ε after a sufficient number of iterations. The initial phase vector may be randomly sampled. If the optimization gets stuck (e.g., is not achieving the preset tolerance), a new initial phase vector should be tried by resampling and starting over. If the optimization algorithm completes successfully, then the initial phase vector was properly chosen.

With reference to equations (1) and (2) above, the following inequality holds: ε≤|U(φ)|. It may therefore be ascertained on the basis of a current value of the utility function (or water level) whether a preset tolerance level has been reached or further iterations of the optimization algorithm are needed.

Figure 8:
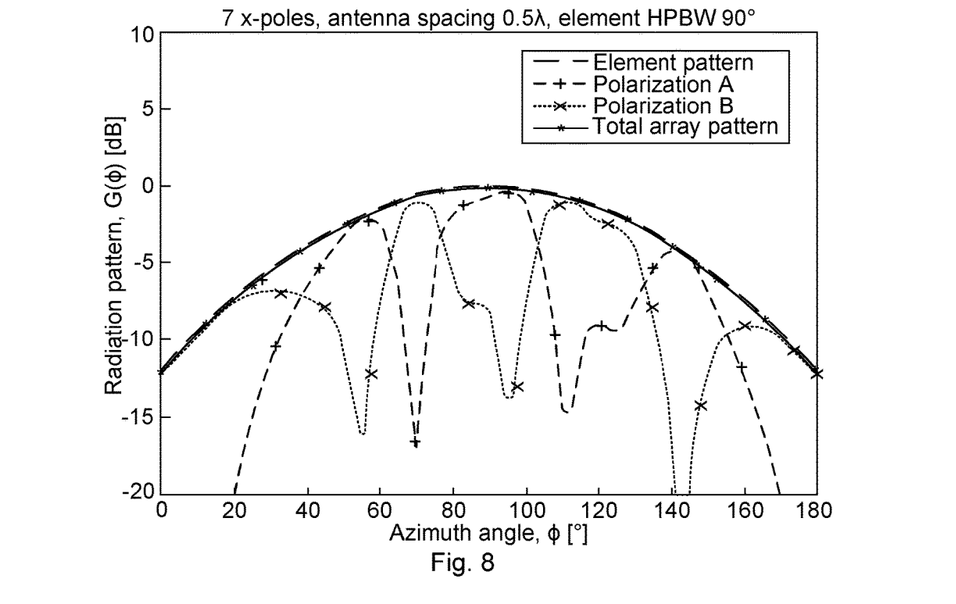

FIG. 8 shows the power pattern of an array consisting of M=7 dual-polarized antennas excited with excitation weights $w_A$ and $w_B$ obtained by means of the aforementioned GD algorithm. FIG. 8 plots the per-polarization patterns, as well as the total beam pattern. As it is seen from FIG. 8, the total power pattern of the array is the same as the pattern of an array sub-element.

As the skilled person understands, the above outlined algorithm could be modified for other utility functions U(φ) than the utility function U(φ) given above as an illustrative example and hence the above outlined algorithm could be applicable to other sequences than polyphase ε-complementary sequence pairs. For example, according to an embodiment the expansion weights $w_A$ and $w_B$ are determined such that:

$$R_{w_A}(\tau) + R_{w_B}(\tau) = \begin{cases} 2M, & \tau = 0 \\ 0, & 0 < |\tau| < Z \end{cases} \quad (3)$$

where $R_{w_A}(\tau)$ and $R_{w_B}(\tau)$, as above, are aperiodic autocorrelation functions of the expansion weights $w_A$ and $w_B$, where Z is a positive integer, and where τ is a sequence index. Here, Z represents the size of the zone where $R_{w_A}(\tau) + R_{w_B}(\tau) = 0$. No condition is imposed for |τ|≥Z. If Z=M−1 then above equation (3) equals the above expression for quaternary Golay complementary sequences. Appendix 1 below lists values of $\varphi_A$ and $\varphi_B$ obtained using the above outlined algorithm, where $\varphi_A = w_A$ and where $\varphi_B = w_B$.

Expansion weights can be concatenated to perform expansion in more than one step. Hence, according to an embodiment the subarrays are further expanded by further expansion weights before defining the one or two beam ports. Hence, according to an embodiment the subarrays are further expanded by further expansion weights $x_A$ and $x_B$, each of length N wherein N≥2 is an arbitrary integer, before defining the one or two beam ports. As an example, the expansion weights $w_A$ and $w_B$ and the further expansion weights $x_A$ and $x_B$ can be combined into combined expansion weights $w'_A$ and $w'_B$, each of length 2MN, according to:

$$w'_A = \begin{bmatrix} x_A \otimes w_A \\ -x_B \otimes \overleftrightarrow{w_B}^* \end{bmatrix}, \quad w'_B = \begin{bmatrix} x_A \otimes w_B \\ x_B \otimes \overleftrightarrow{w_A}^* \end{bmatrix},$$

where a⊗b denotes the Kronecker product of vectors a and b, and $\overleftrightarrow{a}^*$ denotes complex conjugation and flipping order of all elements of vector a. The latter can be, for instance, obtained by a multiplication with an exchange matrix, $\overleftrightarrow{a} = aE_M$, where $E_M$ is an M-by-M all-zeros matrix with 1 on every anti-diagonal entry. Put differently, the exchange matrix has ones on the diagonal going from the lower left corner to the upper right corner and zeros elsewhere. Complex conjugation commutes with flipping order, and may therefore be applied either before or after that operation. This enables expansion weights for wide beams to be determined for an array of length 2MN. Either the expansion weights $w_A$ and $w_B$ or the further expansion weights $x_A$ and $x_B$ can be used as starting expansion weights and the other of the expansion weights $w_A$ and $w_B$ or the further expansion weights $x_A$ and $x_B$ can be used as expander weights.

Figure 9:
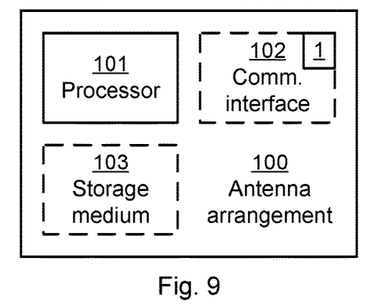
FIG. 9 is a block diagram showing functional units of an antenna arrangement according to an embodiment.

FIG. 9 schematically illustrates, in terms of a number of functional units, the components of an antenna arrangement 100 according to an embodiment. A processor 21 is provided using any combination of one or more of a suitable central processor (CPU), multiprocessor, microcontroller, digital signal processor (DSP), application specific integrated circuit (ASIC), field programmable gate arrays (FPGA) etc., capable of executing software instructions stored in a computer program product 130 (as in FIG. 13), e.g. in the form of a storage medium 103. Thus the processor 101 is thereby arranged to execute methods as herein disclosed. For example, the processor 101 is configured to generate any subarrays and mappings to beam ports as herein disclosed.

The storage medium 103 can also comprise persistent storage, which, for example, can be any single one or combination of magnetic memory, optical memory, solid state memory or even remotely mounted memory. The antenna arrangement 100 can further comprise a communications interface 22 for transmitting and receiving signals As such the communications interface 22 can comprise an antenna array as in any of FIGS. 2, 3, 4 and 5. Hence, according to an embodiment the antenna arrangement 100 comprises an antenna array 1 where the antenna array comprises dual polarized elements for beam forming, where the antenna array is characterized in comprising expansion weights $w_A$ and $w_B$ determined such that, for any integer $\tau_1$, $R_{w_A}(\tau_1) + R_{w_B}(\tau_1) = 2M\delta(\tau_1)$, or for any non-zero integer $\tau_2$, $|R_{w_A}(\tau_2) + R_{w_B}(\tau_2)| \leq \varepsilon$, where $R_{w_A}(\tau)$ and $R_{w_B}(\tau)$ are aperiodic autocorrelation functions of the expansion weights $w_A$ and $w_B$, where $\delta(\tau)$ is the Kronecker delta function, and where ε is constant with respect to τ.

The processor 21 controls the general operation of the antenna arrangement 100 e.g. by sending data and control signals to the communications interface 102 and the storage medium 103, by receiving data and reports from the communications interface 102, and by retrieving data and instructions from the storage medium 103. Other components, as well as the related functionality, of the antenna arrangement 100 are omitted in order not to obscure the concepts presented herein.

Figure 10:
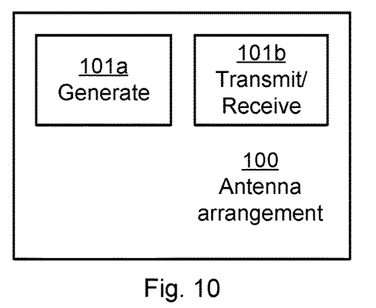
FIG. 10 is a block diagram showing functional modules of an antenna arrangement according to an embodiment.

FIG. 10 schematically illustrates, in terms of a number of functional modules, the components of an antenna arrangement 100 according to an embodiment. The antenna arrangement 100 of FIG. 10 comprises a number of functional modules; a generate module 101a configured to perform below step S102, and a transmit module 101b configured to perform below step S104. The antenna arrangement 100 of FIG. 10 can further comprise a number of optional functional modules. The functionality of each functional module 101a-101b is evident from the context of which the functional modules 101a-101b can be used. In general terms, each functional module 101a-101b can be implemented in hardware or in software. Preferably, one or more or all functional modules 101a-101b can be implemented by the processor 10, possibly in cooperation with functional units 102 and/or 103. The processor 101 can thus be arranged to from the storage medium 103 fetch instructions as provided by a functional module 101a-101b and to execute these instructions, thereby performing any steps as will be disclosed hereinafter.

Figure 11:
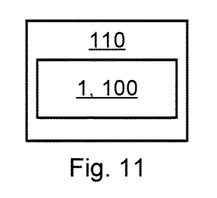
FIG. 11 schematically illustrates a network node comprising an antenna arrangement according to embodiments.
Figure 12:
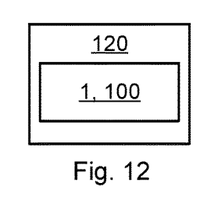
FIG. 12 schematically illustrates a wireless device comprising an antenna arrangement according to embodiments.

The antenna array 1 and/or the antenna arrangement 100 can be provided as integrated circuits, as standalone devices or as a part of a further device. For example, the antenna array 1 and/or antenna arrangement 100 can be provided in a radio transceiver device, such as in a network node 110 or a wireless device 120. FIG. 11 illustrates a network node 110 comprising at least one antenna array 1 and/or antenna arrangement 100 as herein disclosed. The network node 110 can be a BTS, a NodeB, an eNB, a repeater, a backhaul node, or the like. FIG. 12 illustrates a wireless device 120 comprising at least one antenna array 1 and/or antenna arrangement 100 as herein disclosed. The wireless device 120 can be a user equipment (UE), a mobile phone, a tablet computer, a laptop computer, etc. or the like.

The antenna array 1 and/or antenna arrangement 100 can be provided as an integral part of the further device. That is, the components of the antenna array 1 and/or antenna arrangement 100 can be integrated with other components of the further device; some components of the further device and the antenna array 1 and/or antenna arrangement 100 can be shared. For example, if the further device as such comprises a processor, this processor can be configured to perform the actions of the processor 101 associated with the antenna arrangement 100. Alternatively the antenna array 1 and/or antenna arrangement 100 can be provided as separate units in the further device.

Figure 13:
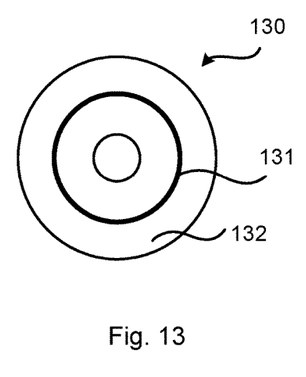
FIG. 13 schematically illustrates a computer program product according to an embodiment.

FIG. 13 shows one example of a computer program product 130 comprising computer readable means 132. On this computer readable means 132, a computer program 131 can be stored, which computer program 131 can cause the processing 101 21 and thereto operatively coupled entities and devices, such as the communications interface 102 and the storage medium 103, to execute methods according to embodiments described herein. The computer program 131 and/or computer program product 130 can thus provide means for performing any steps as herein disclosed.

In the example of FIG. 13, the computer program product 130 is illustrated as an optical disc, such as a CD (compact disc) or a DVD (digital versatile disc) or a Blu-Ray disc. The computer program product 130 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 131 is here schematically shown as a track on the depicted optical disk, the computer program 131 can be stored in any way which is suitable for the computer program product 130.

Figure 14:
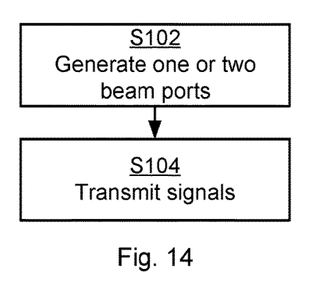
FIG. 14 is a flowchart of a method according to an embodiment.

Reference is now made to FIG. 14 illustrating a method for beam forming using an antenna array 1 according to an embodiment. The antenna array 1 comprises dual polarized elements. The method is performed by an antenna arrangement 100 comprising the antenna array 1. The method is advantageously provided as a computer program 32.

The antenna arrangement 100 is configured to, in a step S102, generate one or two beam ports. The one or two beam ports are defined by combining at least two non-overlapping subarrays. Each subarray has two subarray ports. The two subarray ports have identical power patterns and mutually orthogonal polarizations A, B. The at least two non-overlapping subarrays are combined via expansion weights $w_A$ and $w_B$, each of length M, where M≥2 is an arbitrary integer, and expansion weights $w_A$ are applied to polarization A and expansion weights $w_B$ are applied to polarization B. The expansion weights $w_A$ and $w_B$ map the one or two beam ports to subarray ports such that the one or two beam ports have the same power pattern as the subarrays. At least some of the expansion weights $w_A$ and $w_B$ have identical non-zero magnitude and are related in phase to form a transmission lobe. The antenna arrangement 100 is configured to, in a step S104, transmit signals using the one or two beam ports.

The inventive concept has mainly been described above with reference to a few embodiments. However, as is readily appreciated by a person skilled in the art, other embodiments than the ones disclosed above are equally possible within the scope of the inventive concept, as defined by the appended patent claims. For examples, although using LTE specific terminology, the herein disclosed embodiments can also be applicable to communications networks not based on LTE, mutatis mutandis.

APPENDIX 1

| | | | | | | | Length | | | | | | |
|---|---|---|---|---|---|---|---|---|---|---|---|---|---|
| | | M = 7 | | M = 9 | | M = 14 | | M = 15 | | M = 17 | | M = 19 | |
| | | φA | φB | φA | φB | φA | φB | φA | φB | φA | φB | φA | φB |
| Phases, [rad] | | 0 | 0 | 0 | 0 | 0 | 0 | 0 | 0 | 0 | 0 | 0 | 0 |
| | | 6.2587 | 2.4585 | 1.4405 | 1.3923 | 4.5246 | 0.2577 | 6.2324 | 3.9125 | 1.4736 | 5.9539 | 1.3114 | 5.3473 |
| | | 2.8348 | 4.0558 | 5.2608 | 5.1754 | 5.2599 | 5.2877 | 3.7336 | 3.7764 | 0.9358 | 0.8388 | 2.7545 | 4.8679 |
| | | 2.2658 | 3.3936 | 1.6399 | 1.8485 | 1.0594 | 2.0723 | 3.0579 | 4.4649 | 3.7542 | 4.4518 | 1.5642 | 1.4581 |
| | | 0.7221 | 5.0892 | 0.6357 | 2.2222 | 1.0038 | 6.1426 | 5.3708 | 3.3666 | 1.4177 | 3.4598 | 1.5507 | 6.0776 |
| | | 2.7872 | 3.446 | 5.9776 | 2.7258 | 5.8196 | 2.0067 | 1.9797 | 5.7278 | 4.2208 | 1.6781 | 3.456 | 4.6325 |
| | | 5.9044 | 2.7629 | 3.5797 | 0.4943 | 2.5912 | 6.0808 | 1.5827 | 0.6115 | 2.0319 | 5.5925 | 4.7859 | 5.0716 |
| | | | | 3.0199 | 6.155 | 4.996 | 1.2699 | 4.1791 | 2.5378 | 2.3066 | 4.1207 | 0.5897 | 3.2815 |
| | | | | 4.648 | 1.4844 | 5.3036 | 1.3698 | 1.4676 | 0.4994 | 0.8978 | 5.3328 | 2.2604 | 5.6803 |
| | | | | | | 2.8203 | 2.8677 | 2.8017 | 3.0552 | 1.9413 | 0.4341 | 0.9225 | 4.308 |
| | | | | | | 4.9728 | 3.9223 | 2.5056 | 4.6172 | 1.5124 | 2.4327 | 5.0425 | 0.2542 |
| | | | | | | 3.5382 | 0.4424 | 3.8595 | 1.5153 | 0.1445 | 5.8515 | 0.0719 | 5.1732 |
| | | | | | | 1.665 | 0.4737 | 3.0565 | 6.1673 | 5.8677 | 1.8002 | 4.3587 | 2.1327 |
| | | | | | | 1.8836 | 5.0502 | 3.3519 | 4.2414 | 3.39 | 5.3614 | 3.7136 | 4.6528 |
| | | | | | | | | 1.0216 | 4.1456 | 4.0611 | 0.9812 | 2.1877 | 0.1781 |
| | | | | | | | | | | 0.15 | 1.3534 | 4.9525 | 1.7729 |
| | | | | | | | | | | 6.0242 | 2.9039 | 1.8534 | 0.7252 |
| | | | | | | | | | | | | 1.3628 | 2.217 |
| | | | | | | | | | | | | 0.3955 | 3.5509 |

The invention claimed is:

1. A method for beam forming using an antenna array comprising dual polarized elements, the method comprising:
   generating one of one and two beam ports, the one of the one and two beam ports are defined by combining at least two non-overlapping subarrays,
   each subarray having two subarray ports, the two subarray ports having identical power patterns and mutually orthogonal polarizations A, B,
   the at least two non-overlapping subarrays are combined via expansion weights $w_A$ and $w_B$, each of length M, where M≥2 is an arbitrary integer, expansion weights $w_A$ are applied to polarization A and expansion weights $w_B$ are applied to polarization B,
   the expansion weights $w_A$ and $w_B$ mapping the one or two beam ports to subarray ports such that the one of the one and two beam ports have the same power pattern as the subarrays, and
   at least some of the expansion weights $w_A$ and $w_B$ have identical non-zero magnitude and are related in phase to form a transmission lobe; and
   transmitting signals using said one or two beam ports.

2. The method according to claim 1, wherein M is a product of powers of 2, 3, 5, 11, or 13.

3. The method according to claim 1, wherein M= $2^{a+f}3^b5^c11^d13^e$, where a, b, c, d, e, f are non-negative integers such that f≤c+e and b+c+d+e≤a+2f+1.

4. The method according to claim 1, wherein the expansion weights $w_A$ and $w_B$ are determined such that, for any integer τ:

$$R_{w_A}(\tau) + R_{w_B}(\tau) = 2M\delta(\tau),$$

where $R_{w_A}(\tau)$ and $R_{w_B}(\tau)$ are aperiodic autocorrelation functions of the expansion weights $w_A$ and $w_B$, where δ(τ) is the Kronecker delta function.

5. The method according to claim 1, wherein the expansion weights $w_A$ and $w_B$ are proportional to quaternary Golay complementary sequences.

6. The method according to claim 1, wherein the expansion weights $w_A$ and $w_B$ are proportional to vectors $z_A$ and $z_B$ given as:

$$z_A = e^{j\theta_A}(1,j,-1,1,-1,j,-j,-1,j,j,1)^T, \text{ and}$$

$$z_B = e^{j\theta_B}(1,1,-j,-j,-j,1,1,j,-1,1,-1)^T,$$

where $\theta_A$ and $\theta_B$ are arbitrary real numbers.

7. The method according to claim 1, wherein the expansion weights $w_A$ and $w_B$ are proportional to vectors $z_A$ and $z_B$ given as:

$$z_A = e^{j\theta_A}(1,1,1,j,-1,1,1,-j,1,-1,1,-j,j)^T, \text{ and}$$

$$z_B = e^{j\theta_B}(1,j,-1,-1,-1,j,-1,1,1,-j,-1,1,-j)^T,$$

where $\theta_A$ and $\theta_B$ are arbitrary real numbers.

8. The method according to claim 1, wherein the expansion weights $w_A$ and $w_B$ are determined such that, for any non-zero integer τ:

$$|R_{w_A}(\tau) + R_{w_B}(\tau)| \le \varepsilon,$$

where $R_{w_A}(\tau)$ and $R_{w_B}(\tau)$ are aperiodic autocorrelation functions of the expansion weights $w_A$ and $w_B$, where ε is constant with respect to τ.

9. The method according to claim 8, wherein the constant ε represents a side-lobe power tolerance level.

10. The method according to claim 9, wherein the side-lobe power tolerance level ε is determined such that ε≤0.025·2M, where 2M represents $R_{w_A}(\tau)+R_{w_B}(\tau)$ for τ=0.

11. The method according to claim 8, wherein ε=0.

12. The method according to claim 1, wherein the expansion weights $w_A$ and $w_B$ are determined by applying an optimization algorithm to an optimization problem $$\max_{\varphi} U(\varphi),$$

with a utility function given as:

$$U(\varphi) = \left\{ -\left( \sum_{\tau=1}^{M-1} |R_{w_A}(\tau) + R_{w_B}(\tau)|^p \right)^{1/p} \right\},$$

where $R_{w_A}(\tau)$ and $R_{w_B}(\tau)$ are aperiodic autocorrelation functions of the expansion weights $w_A$ and $w_B$, p≥1 is real, and φ is a vector representing individual phases of components of $w_A$ and $w_B$.

13. The method according to claim 12, wherein the optimization algorithm is a Great Deluge algorithm.

14. The method according to claim 1, wherein the expansion weights $w_A$ and $w_B$ are determined such that:

$$R_{w_A}(\tau) + R_{w_B}(\tau) = \begin{cases} 2M, & \tau = 0 \\ 0, & 0 < |\tau| < Z \end{cases}$$

where $R_{w_A}(\tau)$ and $R_{w_B}(\tau)$ are aperiodic autocorrelation functions of the expansion weights $w_A$ and $w_B$, where Z is a positive integer, and where r is a sequence index.

15. The method according to claim 1, wherein the subarrays are further expanded by further expansion weights $x_A$ and $x_B$, each of length N wherein N≥2 is an arbitrary integer, before defining the one of the one and two beam ports.

16. The method according to claim 15, wherein the expansion weights $w_A$ and $w_B$ and the further expansion weights $x_A$ and $x_B$ are combined into combined expansion weights $w'_A$ and $w'_B$, each of length 2MN, according to $$w'_A = \begin{bmatrix} x_A \otimes w_A \\ -x_B \otimes \overleftrightarrow{w_B}^* \end{bmatrix}, w'_B = \begin{bmatrix} x_A \otimes w_B \\ x_B \otimes \overleftrightarrow{w_A}^* \end{bmatrix},$$

where a⊗b denotes the Kronecker product of vectors a and b, and $\overleftrightarrow{a}^*$ denotes complex conjugation and flipping order of all elements of vector a.

17. An antenna arrangement comprising an antenna array, the antenna array comprising dual polarized elements for beam forming, the antenna array further comprising a processor configured to cause the antenna arrangement to:
   generate one of one and two beam ports, the one of the one and two beam ports are defined by combining at least two non-overlapping subarrays,
   each subarray having two subarray ports, the two subarray ports having identical power patterns and mutually orthogonal polarizations A, B,
   the at least two non-overlapping subarrays are combined via expansion weights $w_A$ and $w_B$, each of length M, where M≥2 is an arbitrary integer, expansion weights $w_A$ are applied to polarization A and expansion weights $w_B$ are applied to polarization B,
   the expansion weights $w_A$ and $w_B$ mapping the one of the one and two beam ports to subarray ports such that the one of the one and two beam ports have the same power pattern as the subarrays, and wherein at least some of the expansion weights $w_A$ and $w_B$ have identical non-zero magnitude and are related in phase to form a transmission lobe; and transmit signals using the one of the one and two beam ports.

18. An antenna arrangement comprising an antenna array, the antenna array comprising dual polarized elements for beam forming, the antenna array further comprising:
  a generate module configured to generate one of one and two beam ports, the one of the one and two beam ports are defined by combining at least two non-overlapping subarrays,
    each subarray having two subarray ports, the two subarray ports having identical power patterns and mutually orthogonal polarizations A, B,
    the at least two non-overlapping subarrays are combined via expansion weights $w_A$ and $w_B$, each of length M, where M≥2 is an arbitrary integer, expansion weights $w_A$ are applied to polarization A and expansion weights $w_B$ are applied to polarization B,
    the expansion weights $w_A$ and $w_B$ map the one of the one and two beam ports to subarray ports such that the one or two beam ports have the same power pattern as the subarrays, and
    at least some of the expansion weights $w_A$ and $w_B$ having identical non-zero magnitude and are related in phase to form a transmission lobe; and
  a transmit module configured to transmit signals using the one of the one and two beam ports.

19. An antenna arrangement comprising an antenna array (1), the antenna array comprising:
  dual polarized elements for beam forming: and
  expansion weights $w_A$ and $w_B$ determined such that, for any integer $\tau_1$, $R_{w_A}(\tau_1)+R_{w_B}(\tau_1)=2M\delta(\tau_1)$, and for any non-zero integer $\tau_2$, $|R_{w_A}(\tau_2)+R_{w_B}(\tau_2)|\leq\varepsilon$, where $R_{w_A}(\tau)$ and $R_{w_B}(\tau)$ are aperiodic autocorrelation functions of the expansion weights $w_A$ and $w_B$, where $\delta(\tau)$ is the Kronecker delta function, and where $\varepsilon$ is constant with respect to $\tau$.

20. The antenna arrangement according to claim 17, wherein the antenna arrangement is included in a network node.

21. The antenna arrangement according to claim 17, wherein the antenna arrangement is part of a wireless device.

22. A computer storage medium storing a computer program for beam forming using an antenna array comprising dual polarized elements, the computer program comprising computer program code which, when executed by a processor of an antenna arrangement, causes the antenna array to:
  generate one of one and two beam ports, the one of the one and two beam ports are defined by combining at least two non-overlapping subarrays,
    each subarray having two subarray ports, the two subarray ports having identical power patterns and mutually orthogonal polarizations A, B,
    the at least two non-overlapping subarrays are combined via expansion weights $w_A$ and $w_B$, each of length M, where M≥2 is an arbitrary integer, expansion weights $w_A$ are applied to polarization A and expansion weights $w_B$ are applied to polarization B,
    the expansion weights $w_A$ and $w_B$ mapping the one of the one and two beam ports to subarray ports such that the one or two beam ports have the same power pattern as the subarrays, and
    at least some of the expansion weights $w_A$ and $w_B$ having identical non-zero magnitude and are related in phase to form a transmission lobe; and
  transmit signals using the one of the one and two beam ports.

* * * * *

UNITED STATES PATENT AND TRADEMARK OFFICE
CERTIFICATE OF CORRECTION

PATENT NO. : 10,700,762 B2
APPLICATION NO. : 15/100482
DATED : June 30, 2020
INVENTOR(S) : Girnyk et al.

It is certified that error appears in the above-identified patent and that said Letters Patent is hereby corrected as shown below:

In the Specification

In Column 1, Line 54, delete "number or antennas" and insert -- number of antennas --, therefor.

In Column 3, Line 54, delete "$\tau_2 |R_{w_A}(\tau_2) + R_{w_B}(\tau_2)| \varepsilon,$" and insert -- $\tau_2 |R_{w_A}(\tau_2) + R_{w_B}(\tau_2)| \leq \varepsilon,$ --, therefor.

In Column 8, Line 27, delete "$R_{w_A}(\tau) \; R_{w_B}(\tau) = 2M\delta(\tau),$" and insert -- $R_{w_A}(\tau) + R_{w_B}(\tau) = 2M\delta(\tau)$ --, therefor.

In Column 8, Line 37, delete "$z_B = e^{j\Theta_B}(1,1,-j,j,-j,1,1,j,-1,1,-1)^T.$" and insert -- $z_B = e^{j\Theta_B}(1,1,-j,-j,-j,1,1,j,-1,1,-1)^T.$ --, therefor.

In Column 9, Line 13, delete "$z_A \rightarrow (0^T, z_A^T, 0^T)^T$ and $z_B \rightarrow (0^T, z_B^T, 0^T)^T$" and insert -- $z_A \rightarrow (0^T, z_A^T, 0^T)^T$ and $z_B \rightarrow (0^T, z_B^T, 0^T)^T$ --, therefor.

In Column 9, Line 33, delete "$|R_{w_A}(\tau) R_{w_B}(\tau)| \leq \varepsilon,$" and insert -- $|R_{w_A}(\tau) + R_{w_B}(\tau)| \leq \varepsilon,$ --, therefor.

In Column 11, Line 37, delete "$R_{w_A}$" and insert the same at Line 38, before "$(\tau) + R_{w_B}(\tau) = 0.$" as a continuation Equation.

In Column 11, Line 64, delete "matrix," and insert -- matrix, i.e., --, therefor.

Signed and Sealed this
Twenty-ninth Day of December, 2020

Andrei Iancu
*Director of the United States Patent and Trademark Office*

CERTIFICATE OF CORRECTION (continued)
U.S. Pat. No. 10,700,762 B2

In Column 12, Lines 25-26, delete "one or combination" and insert -- one or more combination --, therefor.

In Column 13, Line 33, delete "processing 101 21" and insert -- processor 101, 21--, therefor.

In the Claims

In Column 16, Line 33, in Claim 14, delete "where r" and insert -- where τ --, therefor.

In Column 17, Lines 32-33, in Claim 19, delete "array (1), the" and insert -- array, the --, therefor.

In Column 17, Line 34, in Claim 19, delete "forming: and" and insert -- forming; and --, therefor.